(12) United States Patent
Lin (10) Patent No.: US 7,015,998 B2
(45) Date of Patent: Mar. 21, 2006

(54) TRANSFLECTIVE LCD WITH FIRST AND SECOND LIQUID CRYSTAL LAYERS SPACED APART BY A WALL

(75) Inventor: Ching-Huang Lin, Sinying (TW)

(73) Assignee: AU Optronics Corp., Hsinchu (TW)

(*) Notice: Subject to any disclaimer, the term of this patent is extended or adjusted under 35 U.S.C. 154(b) by 54 days.

(21) Appl. No.: 10/865,968

(22) Filed: Jun. 14, 2004

(65) Prior Publication Data

US 2005/0012879 A1 Jan. 20, 2005

(30) Foreign Application Priority Data

Jul. 15, 2003 (TW) ............................. 92119339 A (51) Int. Cl.
*G02F 1/1335* (2006.01)

(52) U.S. Cl. ...................... 349/114; 349/113; 349/156; 349/179; 349/185

(58) Field of Classification Search ................. 349/114
See application file for complete search history.

(56) References Cited

U.S. PATENT DOCUMENTS

| 2003/0043334 A1* | 3/2003 | Sato et al. ................. 349/156 |
| 2004/0080690 A1* | 4/2004 | Ko et al. .................... 349/114 |
| 2005/0018115 A1* | 1/2005 | Liao et al. .................. 349/114 |

* cited by examiner

*Primary Examiner*—Andrew Schechter
*Assistant Examiner*—(Nancy) Thanh-Nhan P Nguyen
(74) *Attorney, Agent, or Firm*—Rabin & Berdo, PC (57) ABSTRACT

A transflective LCD panel has a transmissive region and a reflective region and includes a first substrate, a second substrate opposite to the first substrate, a reflective plate formed on the second substrate and located within the reflective region, and a first liquid crystal layer and a second liquid crystal layer that are filled between the first substrate and the second substrate. The first and second liquid crystal layers correspond to the transmissive and reflective regions, respectively. The second liquid crystal layer is doped with a chiral material. When a voltage is applied, liquid crystal molecules in a middle section of the first liquid crystal layer are substantially arranged in a tilt angle θ, and the liquid crystal molecules of the second liquid crystal layer are tilted by the tilt angle and further twisted.

13 Claims, 8 Drawing Sheets

TRANSFLECTIVE LCD WITH FIRST AND SECOND LIQUID CRYSTAL LAYERS SPACED APART BY A WALL

This application claims the benefit of Taiwan application Serial No. 092119339, filed Jul. 15, 2003, the subject matter of which is incorporated herein by reference.

BACKGROUND OF THE INVENTION

1. Field of the Invention

The invention relates to a transflective LCD panel (Liquid Crystal Display Panel), and more particularly to a transflective LCD panel with enhanced liquid crystal efficiency and having liquid crystal molecules with different pitches in a transmissive region and a reflective region.

2. Description of the Related Art

With the progress of the technology, the transflective LCD panel plays an important role in the market. More particularly, in the age with fully developed communication, the transflective LCD panel may be applied to a display screen of a mobile phone so that the user may clearly recognize the displayed contents on the display screen in either a dark room or a quite bright outdoor environment.

Figure 1:
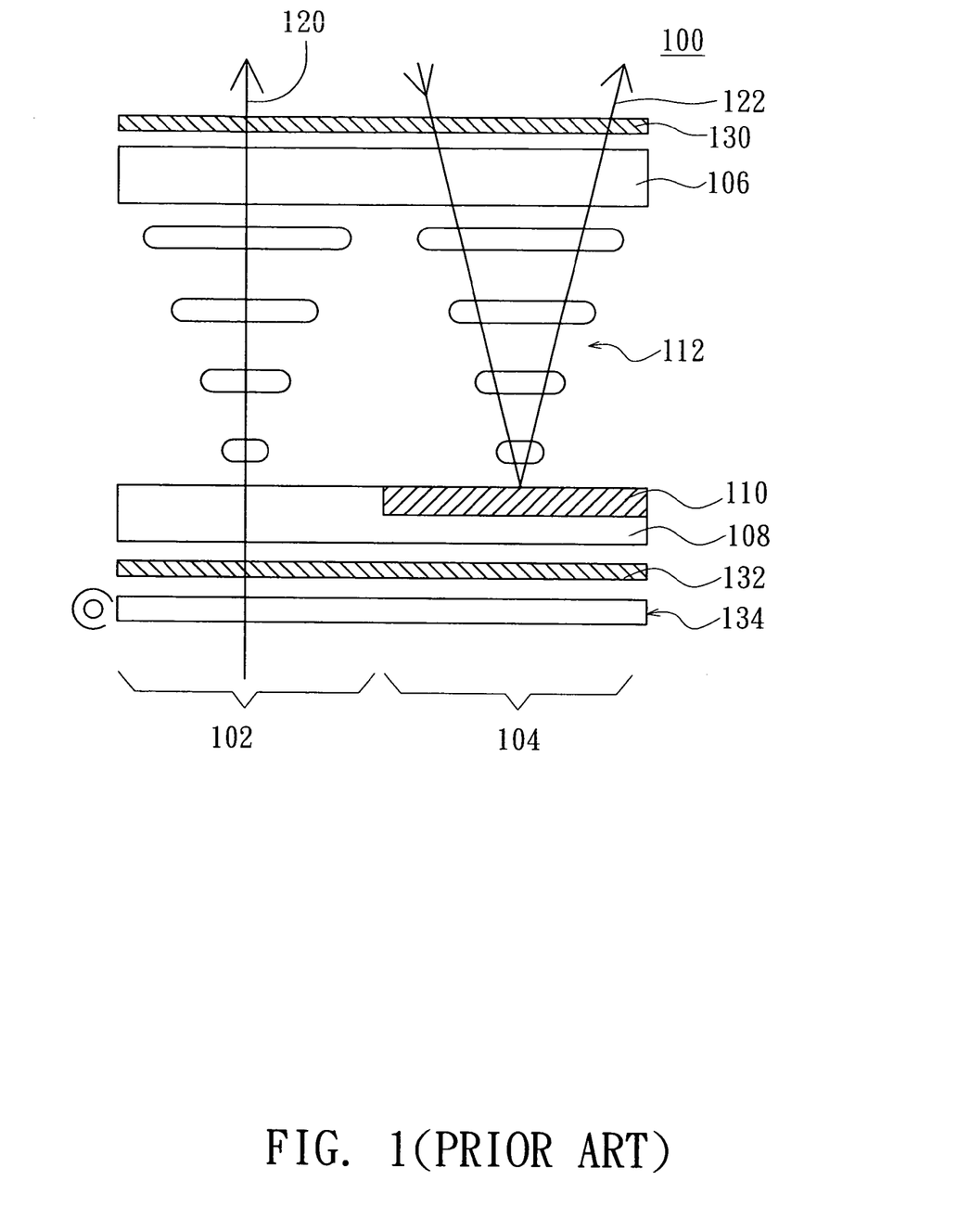
FIG. 1 is a schematic illustration showing a conventional TN (Twisted Nematic) transflective LCD panel.

FIG. 1 is a schematic illustration showing a conventional TN (Twisted Nematic) transflective LCD panel. The TN transflective LCD panel 100 includes a transmissive region 102 and a reflective region 104. The transflective LCD panel 100 further includes an upper substrate 106, a lower substrate 108, a reflective plate 110, and a liquid crystal layer 112. The lower substrate 108 is opposite to the upper substrate 106. The reflective plate 110 is formed on the lower substrate 108 and located within the reflective region 104. The liquid crystal layer 112 is filled between the upper substrate 106 and the lower substrate 108. In addition, a common electrode (not shown in the drawing) is formed on a lower surface of the upper substrate 106, and a pixel electrode (not shown in the drawing) is formed on an upper surface of the lower substrate 108. An upper polarizer 130 is further disposed above the upper substrate 106, and a lower polarizer 132 and a backlight module 134 are disposed below the lower substrate 108.

When no voltage is applied to the common electrode and the pixel electrode, the TN transflective LCD panel 100 is in a bright state. At this time, a light ray 120 supplied from the backlight module 134 passes through the lower polarizer 132, the liquid crystal layer 112 of the transmissive region 102, and the upper polarizer 130. On the other hand, a light ray 122 supplied from the outside passes through the upper polarizer 130 and the liquid crystal layer 112 of the reflective region 104, and is then reflected by the reflective plate 110. Thereafter, the light ray 122 is output after further passing through the liquid crystal layer 112 of the reflective region 104 and the upper polarizer 130. It can be seen from FIG. 1 that the light path of the light ray 122 is twice that of the light ray 120. Thus, it is often impossible to consider both the transmissive mode corresponding to the transmissive region 102 and the reflective mode corresponding to the reflective region 104 in the design stage, and it is difficult to optimize the optical efficiency in both of the transmissive mode and the reflective mode.

In addition, the VA (vertical alignment) transflective LCD panel also encounters the problem of incapable of considering the optical efficiency in both of the reflective mode and the transmissive mode, and the condition in the VA transflective LCD panel is more serious than that of the TN transflective LCD panel.

SUMMARY OF THE INVENTION

It is therefore an object of the invention to provide a transflective LCD panel including a liquid crystal layer having a reflective region doped with a chiral material to make the liquid crystal layer of the reflective region simultaneously generate polarization rotation effects and phase retardation effects with respect to light rays. Accordingly, the design may be simplified and it is possible to achieve good optical efficiency in both the transmissive mode and the reflective mode.

The invention achieves the above-identified object by providing a transflective LCD panel having a transmissive region and a reflective region. The LCD panel includes a upper substrate, a lower substrate, a common electrode, a pixel electrode, a reflective plate, a first quarter-wavelength plate and a second quarter-wavelength plate, a first linear polarizer and a second linear polarizer, a first alignment film and a second alignment film, and a first liquid crystal layer and a second liquid crystal layer. The lower substrate is opposite to the upper substrate. The common electrode is formed on a first surface of the upper substrate. The pixel electrode is formed on a first surface of the lower substrate and is opposite to the common electrode. The reflective plate is formed on the first surface of the lower substrate and located within the reflective region. The first quarter-wavelength plate is disposed above a second surface of the upper substrate. The first linear polarizer is disposed above the first quarter-wavelength plate. The second quarter-wavelength plate is disposed below a second surface of the lower substrate. The second linear polarizer is disposed below the second quarter-wavelength plate. The first alignment film covers the common electrode and the second alignment film covers the pixel electrode and the reflective plate. The first and second liquid crystal layers are filled between the upper substrate and the lower substrate. The first liquid crystal layer corresponds to the transmissive region and the second liquid crystal layer corresponds to the reflective region. The second liquid crystal layer is doped with a chiral material. When a voltage is applied between the common electrode and the pixel electrode, liquid crystal molecules in a middle section of the first liquid crystal layer are substantially arranged in a tilt angle. The liquid crystal molecules of the second liquid crystal layer are tilted by the tilt angle and further twisted.

The invention also achieves the above-identified object by providing a transflective LCD panel having a transmissive region and a reflective region. The LCD panel includes a upper substrate, a lower substrate, a common electrode, a pixel electrode, a reflective plate, a first quarter-wavelength plate and a second quarter-wavelength plate, a first linear polarizer and a second linear polarizer, a first vertical alignment film and a second vertical alignment film, and a first liquid crystal layer and a second liquid crystal layer. The lower substrate is opposite to the upper substrate, and a gap is formed between the upper substrate and the lower substrate. The common electrode is formed on a first surface of the upper substrate. The pixel electrode is formed on a first surface of the lower substrate and is opposite to the common electrode. The reflective plate is formed on the first surface of the lower substrate and located within the reflective region. The first quarter-wavelength plate is disposed above a second surface of the upper substrate. The first linear polarizer is disposed above the first quarter-wavelength plate. The second quarter-wavelength plate is disposed below a second surface of the lower substrate. The second linear polarizer is disposed below the second quarter-wavelength plate. The first vertical alignment film covers the common electrode and the second vertical alignment film covers the pixel electrode and the reflective plate. The first and second liquid crystal layers are filled between the upper substrate and the lower substrate and spaced apart by a wall. The first liquid crystal layer corresponds to the transmissive region and the second liquid crystal layer corresponds to the reflective region. Liquid crystal molecules of the first and second liquid crystal layers are negative liquid crystal molecules. The second liquid crystal layer is doped with a chiral material. When a voltage is applied between the common electrode and the pixel electrode, the liquid crystal molecules in a middle section of the first liquid crystal layer are substantially arranged in a tilt angle. The liquid crystal molecules of the second liquid crystal layer are tilted by the tilt angle and further twisted, and a pitch when the liquid crystal molecules of the second liquid crystal layer are twisted is greater than or equal to four times of the gap.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIGS. 4A and 4B show relationships between the applied voltages (V) and the transmission rates of the LCD panel of FIGS. 2A and 2B, respectively, wherein FIG. 4A shows the transmission rate of the transmissive region and FIG. 4B shows the normal reflectivity of the reflective region.

FIGS. 7A and 7B show relationships between the applied voltages (V) and the transmission rates of the LCD panel of FIGS. 6A and 6B, respectively, wherein FIG. 7A shows the transmission rate of the transmissive region and FIG. 7B shows the normal reflectivity of the reflective region.

DETAILED DESCRIPTION OF THE INVENTION

The spirit of invention resides in doping a chiral material into negative liquid crystal molecules of the reflective region to make the liquid crystal layer of the reflective region simultaneously generate polarization rotation effects and phase retardation effects with respect to the light rays. Consequently, the optical efficiency of the transmissive region and the reflective region may be enhanced under the fixed gap between the upper substrate and the lower substrate.

First Embodiment

Figure 2A:
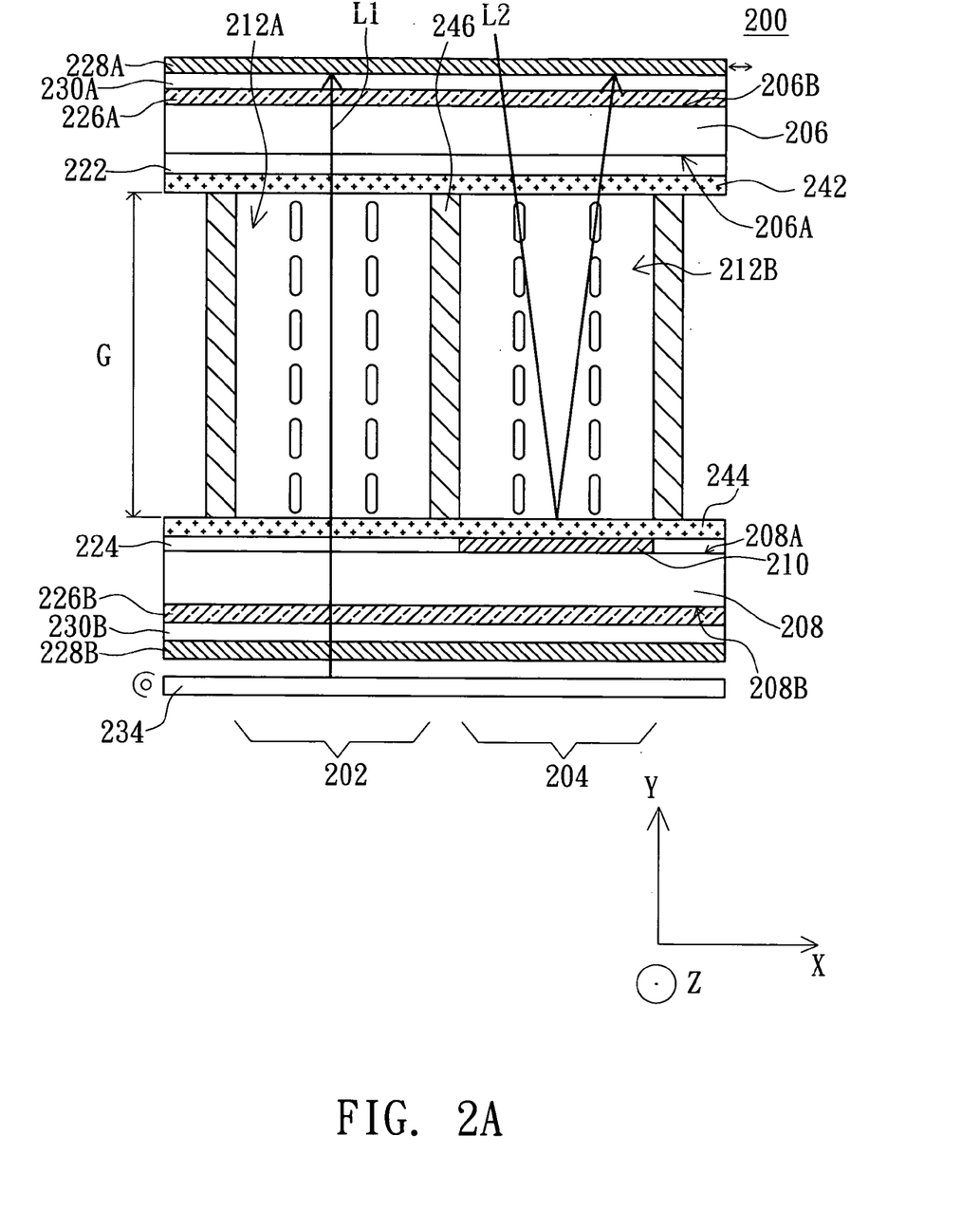
FIG. 2A is a schematic illustration showing a transflective LCD panel in a dark state according to a first embodiment of the invention.
Figure 2B:
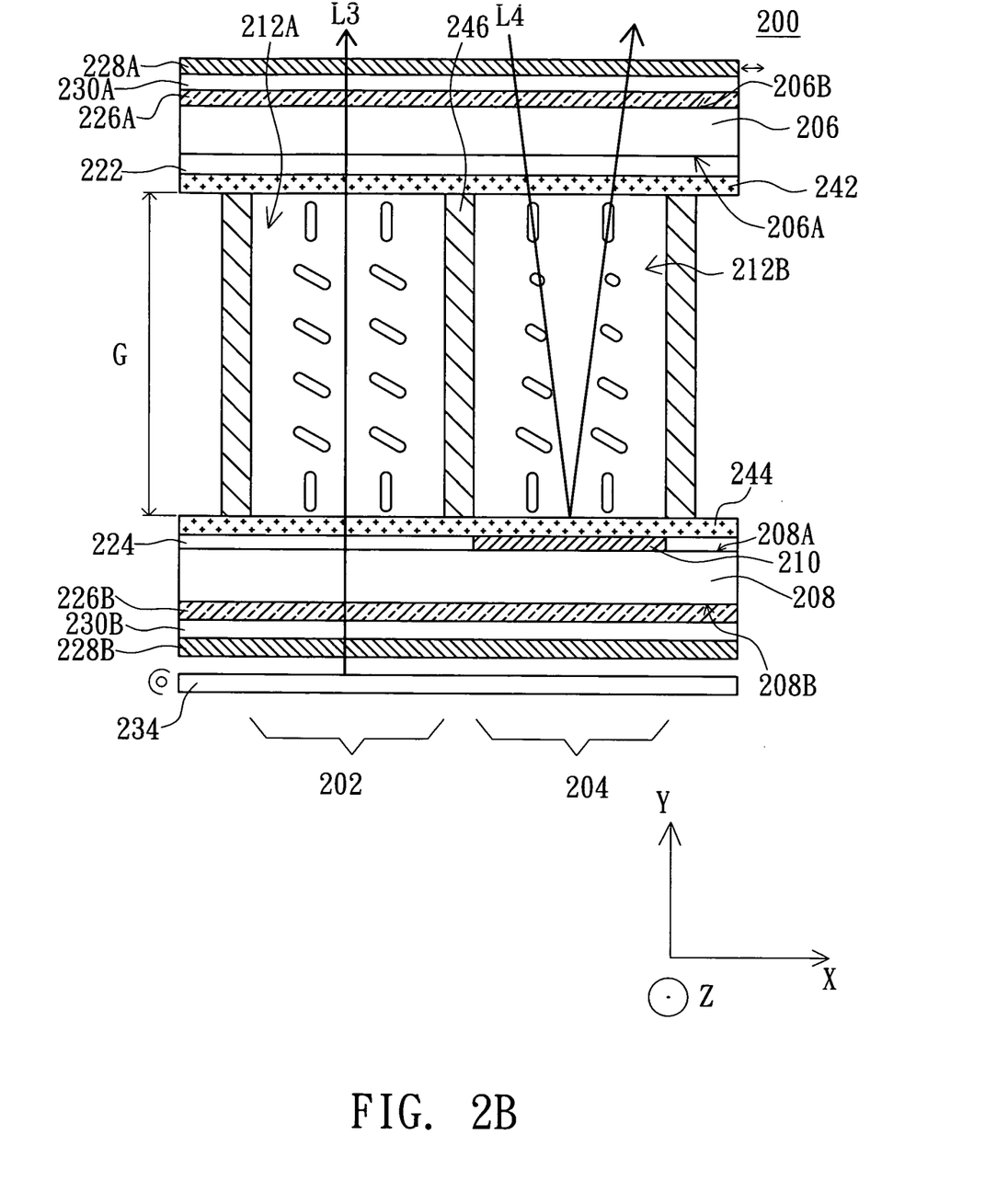
FIG. 2B is a schematic illustration showing the transflective LCD panel in a bright state according to the first embodiment of the invention.

FIG. 2A is a schematic illustration showing a transflective LCD panel in a dark state according to a first embodiment of the invention. FIG. 2B is a schematic illustration showing the transflective LCD panel in a bright state according to the first embodiment of the invention. Referring to FIGS. 2A and 2B, the transflective LCD panel 200 has a transmissive region 202 and a reflective region 204. The LCD panel 200 includes a upper substrate 206, a lower substrate 208, a reflective plate 210, a first quarter-wavelength plate 226A, a second quarter-wavelength plate 226B, a first linear polarizer 228A, a second linear polarizer 228B, a first half-wavelength plate 230A, a second half-wavelength plate 230B, a first vertical alignment film 242, a second vertical alignment film 244, a first liquid crystal layer 212A, and a second liquid crystal layer 212B.

The lower substrate 208 is opposite to the upper substrate 206, and a gap G is defined between the upper substrate 206 and the lower substrate 208. A common electrode 222 is formed on a first surface 206A of the upper substrate 206, while a pixel electrode 224 opposite to the common electrode 222 is formed on a first surface 208A of the lower substrate 208. The reflective plate 210 is also formed on the first surface 208A of the lower substrate 208 and located within the reflective region 204.

The first quarter-wavelength plate 226A is disposed above a second surface 206B of the upper substrate 206. The first half-wavelength plate 230A is disposed above the first quarter-wavelength plate 226A, and the first linear polarizer 228A is disposed above the first half-wavelength plate 230A. The second quarter-wavelength plate 226B is disposed below a second surface 208B of the lower substrate 208. The second half-wavelength plate 230B is disposed below the second quarter-wavelength plate 226B, and the second linear polarizer 228B is disposed below the second half-wavelength plate 230B. A backlight module 234 is disposed below the second linear polarizer 228B to provide the required light ray L1. When the quarter-wavelength plate and the half-wavelength plate are correspondingly used, they can be equivalent to a broadband quarter-wavelength plate.

The light-transmissive axes (Trans-axes) of the first and second linear polarizers 228A and 228B are orthogonal, the optical axes of the first and second quarter-wavelength plates 226A and 226B are orthogonal, and the optical axes of the first and second half-wavelength plates 230A and 230B are also orthogonal. In this embodiment, for example, the angle between the X-axis and the light-transmissive axis of the first linear polarizer 228A is 0 degrees, the angle between the X-axis and the light-transmissive axis of the second linear polarizer 228B is 90 degrees, the angle between the X-axis and the optical axis of the first quarter-wavelength plate 226A is 75 degrees, the angle between the X-axis and the second quarter-wavelength plate 226B is (−15) degrees, the angle between the X-axis and the optical axis of the first half-wavelength plate 230A is 15 degrees, and the angle between the X-axis and the optical axis of the second half-wavelength plate 230B is 105 degrees.

The first vertical alignment film 242 covers the common electrode 222, and the second vertical alignment film 244 covers the pixel electrode 224 and the reflective plate 210. The first and second liquid crystal layers 212A and 212B are filled between the upper substrate 206 and the lower substrate 208. The first liquid crystal layer 212A corresponds to the transmissive region 202 and the second liquid crystal layer 212B corresponds to the reflective region 204. The angle between the rubbing directions of the first and second vertical alignment films 242 and 244 in the rubbing process is 180 degrees.

In addition, a color filter (not shown) is formed on the first surface 206A of the upper substrate 206, and a thin film transistor (TFT) (not shown) is formed on the first surface 208A of the lower substrate 208. An LCD panel has several scan lines and data lines (not shown). The thin film transistor has a gate controlled by a scan line, a drain connected to a data line, and a source electrically connected to the pixel electrode 224. The reflective plate 210 may be electrically connected to the pixel electrode 224 in order to control the alignment of the liquid crystal molecules. When the scan line is enabled, the pixel data is transferred to the pixel electrode via the data line and the thin film transistor. At this time, the applied voltage between the common electrode 222 and the pixel electrode 224 changes the arrangement of the liquid crystal molecules.

The liquid crystal molecules of the first and second liquid crystal layers 212A and 212B are negative type liquid crystal molecules. The first and second liquid crystal layers 212A and 212B are spaced apart by a wall 246. A chiral material is doped into the negative liquid crystal molecules of the second liquid crystal layer 212B.

When no voltage is applied between the common electrode 222 and the pixel electrode 224, the liquid crystal molecules of the first and second liquid crystal layers 212A and 212B are arranged in a manner perpendicular to the first and second vertical alignment films 242 and 244. At this time, the LCD panel 200 is in the dark state, as shown in FIG. 2A. When a voltage is applied between the common electrode 222 and the pixel electrode 224, the liquid crystal molecules in a middle section of the first liquid crystal layer 212A are arranged in a tilt angle θ. The twist angles of the liquid crystal molecules in the middle section of the first liquid crystal layer 212A are small and may be regarded as having no polarization rotation effect. Because the second liquid crystal layer 212B is doped with the chiral material, the chiral material causes the liquid crystal molecules of the second liquid crystal layer 212B to twist. Hence, the arrangement of the liquid crystal molecules of the second liquid crystal layer 212B is such that each of the liquid crystal molecules has a tilt angle θ and is further twisted to have a greater twist angle so as to have the polarization rotation effect. At this time, the LCD panel 200 is in the bright state, as shown in FIG. 2B.

The tilt angle E is an angle between the liquid crystal director (LC director), which is a long axis direction of the liquid crystal molecule, and a normal vector (Y-direction) of the first vertical alignment film 242. The liquid crystal molecules of the second liquid crystal layer 212B are twisted on a plane substantially at an angle of (90-θ) degrees with respect to the XZ plane. In FIG. 2B, for example, the liquid crystal molecules in the middle layer of the second liquid crystal layer 212B are twisted about 90 degrees. A pitch is defined as the thickness of the liquid crystal layer, in which the liquid crystal molecules are twisted 360 degrees. For example, the thickness of the second liquid crystal layer 212B of FIG. 2B is ¼ pitches.

When the concentrations of the doped chiral materials are not the same, the pitches of the liquid crystal molecules are also different. The invention can obtain the optimum effect when the concentration of the doped chiral material makes the pitch of the liquid crystal molecules of the second liquid crystal layer 212B greater than four times of the gap G. The invention makes the liquid crystal molecules of the middle layer of the second liquid crystal layer 212B twist about 90 degrees by forming an angle of 180 degrees between the rubbing directions of the first and second vertical alignment films 242 and 244, and doping with the chiral material with a proper concentration. In addition, the pitch of the liquid crystal molecules of the second liquid crystal layer 212B is preferably about 20 to 40 microns ($\mu$m).

In general, when light rays pass through the liquid crystal layer, they will be influenced by the polarization rotation effects or phase retardation effects of the liquid crystal molecule. As shown in FIG. 2B, the light ray L3 in the first liquid crystal layer 212A is mainly influenced by the phase retardation effects of the liquid crystal molecules, while the light ray L4 in the second liquid crystal layer 212B is influenced by not only the phase retardation effects of the liquid crystal molecules but also the polarization rotation effects of the liquid crystal molecules.

In order to achieve the good optical efficiency, it is necessary to design the retardation $\Delta$nd according to different modes. As for an LCD panel having only the transmissive mode, the thickness of the liquid crystal layer required by the twist nematic transflective LCD panel of FIG. 1 is greater than that of the liquid crystal layer of the first liquid crystal layer 212A shown in FIGS. 2A and 2B. If a transmissive type LCD panel is to be implemented using only the second liquid crystal layer 212B shown in FIGS. 2A and 2B, the required thickness of the liquid crystal layer of the second liquid crystal layer 212B is also greater than (approximately twice) that of the liquid crystal layer of the first liquid crystal layer 212A shown in FIGS. 2A and 2B. Please refer to FIG. 2B. As for the second liquid crystal layer 212B used in the reflective region of the invention, because the length of the light path of the light ray L4 in the reflective mode is twice that of the light ray L3 in the transmissive mode, the light ray L4 may be regarded as transmitting a thickness twice that of the second liquid crystal layer 212B. Consequently, after the invention has designed the desired gap G between the upper substrate 206 and the lower substrate 208 according to the first liquid crystal layer 212A in order to achieve good optical efficiency, the gap G is also suitable for the second liquid crystal layer 212B to obtain good optical efficiency after the light ray L4 is reflected by the reflective plate 210.

The polarization of the light rays L1, L2, L3 and L4 in FIGS. 2A and 2B will be briefly described in the following.

As shown in FIG. 2A, when no voltage is applied between the common electrode 222 and the pixel electrode 224, the light ray L1 emitted from the backlight module 234 passes through the second linear polarizer 228B in the transmissive region 202, and then the light ray L1 is converted into linearly polarized light that is polarized along the Z-direction. After the light ray L1 continues passing through the second half-wavelength plate 230B and the second quarter-wavelength plate 226B, the light ray L1 is converted into circularly polarized light, which is assumed to be right-circularly polarized light. When the light ray L1 continues passing through the first liquid crystal layer 212A, the light ray L1 is still the right-circularly polarized light because the liquid crystal molecules of the first liquid crystal layer 212A are arranged in a manner perpendicular to the first vertical alignment film 242 and thus cause no phase retardation effect on the light ray L1. After the light ray L1 continues passing through the first quarter-wavelength plate 226A and the first half-wavelength plate 230A, the light ray L1 is converted into linearly polarized light that is polarized along the Z-direction and is blocked by the first linear polarizer 228A. At this time, the transmissive region 202 is in the dark state.

Please refer to FIG. 2A again. When no voltage is applied between the common electrode 222 and the pixel electrode 224, the incident light ray L2 from the ambient environment passes through the first linear polarizer 228A in the reflective region 204, and then the light ray L2 is converted into linearly polarized light that is polarized along the X-direction. After the light ray L2 continues passing through the first half-wavelength plate 230A and the first quarter-wavelength plate 226A, it is converted into left-circularly polarized light. When the light ray L2 continues passing through the second liquid crystal layer 212B, it is still the left-circularly polarized light because the liquid crystal molecules of the second liquid crystal layer 212B are arranged in a manner perpendicular to the first vertical alignment film 242 and thus cause no phase retardation effect on the light ray L2. After the light ray L2 is reflected by the reflective plate 210, it is converted into right-polarized light. After the light ray L2 passes through the first quarter-wavelength plate 226A and the first half-wavelength plate 230A again, it is converted into linearly polarized light that is polarized along the Z-direction and is blocked by the first linear polarizer 228A. At this time, the reflective region 204 is also in the dark state.

Please refer to FIG. 2B. When a voltage is applied between the common electrode 222 and the pixel electrode 224, the liquid crystal molecules of the first liquid crystal layer 212A will be influenced by the electric field and then tilted. The invention designs the retardation $\Delta nd$ of the tilted liquid crystal molecule of the first liquid crystal layer 212A to be equal to the value of the half-wavelength ($\lambda/2$). In the transmissive region 202, after the light ray L3 emitted from the backlight module 234 has passed through the second linear polarizer 228B, the second half-wavelength plate 230B and the second quarter-wavelength plate 226B, the light ray L3 is converted into right-circularly polarized light. After the light ray L3 continues passing through the first liquid crystal layer 212A, it is converted into left-circularly polarized light. After the light ray L3 continues passing through the first quarter-wavelength plate 226A and the first half-wavelength plate 230A, it is converted into linearly polarized light that is polarized along the X-direction and may pass through the first linear polarizer 228A. At this time, the transmissive region 202 is in the bright state.

Please refer to FIG. 2B again. When a voltage is applied between the common electrode 222 and the pixel electrode 224, the liquid crystal molecules of the second liquid crystal layer 212B will be influenced by the electric field and then tilted and twisted. At this time, the liquid crystal molecules of the second liquid crystal layer 212B may simultaneously make the light ray to generate polarization rotation and phase retardation. The influence of the tilted and twisted liquid crystal molecules of the second liquid crystal layer 212B on the polarization of the incident light is equivalent to a plate having a retardation $\Delta nd$ approximately equal to one quarter-wavelength ($\lambda/4$). In the reflective region 204, after the incident light ray L4 from the ambient environment has passed through the first linear polarizer 228A, it is converted into linearly polarized light that is polarized along the X-direction. After the light ray L4 continues passing through the first half-wavelength plate 230A and the first quarter-wavelength plate 226A, it is converted into left-circularly polarized light. After the light ray L4 passing through the second liquid crystal layer 212B is reflected by the reflective plate 210 and then passes through the second liquid crystal layer 212B again, the effects of passing through the second liquid crystal layer 212B twice and being reflected by the reflective plate 210 make the light ray L4 be still the left-polarized light. After the light ray L4 passes the first quarter-wavelength plate 226A and the first half-wavelength plate 230A again, it is converted into linearly polarized light that is polarized along the X-direction and may pass through the first linear polarizer 228A. At this time, the reflective region 204 is also in the bright state.

The methods for doping a chiral material in the second liquid crystal layer 212B and for forming the wall 246 will be described in the following.

The method for doping the chiral material in the second liquid crystal layer 212B includes the following steps. First, a tunable chiral material (TCM) is simultaneously doped in the first and second liquid crystal layers 212A and 212B. Then, the backside of the LCD panel 200 (i.e., the backside of the reflective plate 210) is exposed to make the tunable chiral material of the transmissive region 202 despiralize. The effective concentration of the chiral material of the second liquid crystal layer 212B is greater than that of the chiral material of the first liquid crystal layer 212A by making the first and second liquid crystal layers 212A and 212B obtain different exposure amounts. In such a doping method, both the first and second liquid crystal layers 212A and 212B are doped with the chiral material. However, it is possible to make the effective concentration of the chiral material in the first liquid crystal layer 212A very small and thus to make the twisting of the liquid crystal molecules of the first liquid crystal layer 212A negligible so as to obtain the first embodiment of the invention.

However, even if the liquid crystal molecules of the first liquid crystal layer 212A will be twisted, the object of the invention also may be achieved as long as the pitch corresponding to the first liquid crystal layer 212A is greater than that corresponding to the second liquid crystal layer 212B.

The wall 246 may be formed by: (a) adding proper monomers to the liquid crystal layer and utilizing a mask and an exposure process to form the wall 246 between the transmissive region 202 and the reflective region 204; or (b) utilizing the photoresist or organic material that is exposed, developed, and etched to form the wall 246 between the transmissive region 202 and the reflective region 204.

In addition, it is also possible to adjust the twist angles of the liquid crystal molecules by adjusting the elastic coefficient of the liquid crystal.

The simulation result of the first embodiment of the invention will be described in the following.

Figure 3:
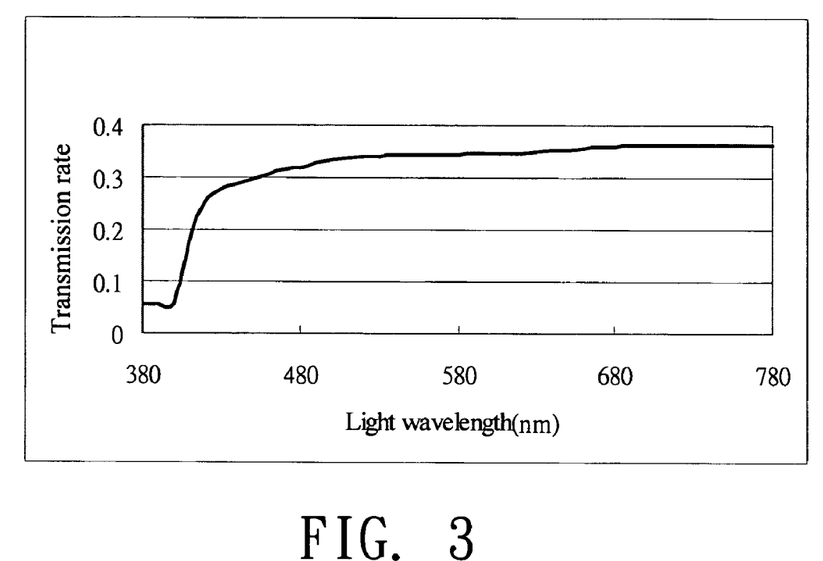
FIG. 3 is a spectrum diagram showing a transmission rate of the LCD panel using two polarizers with two parallel light-transmissive axes.

FIG. 3 is a spectrum diagram showing a transmission rate of the LCD panel using two polarizers with two parallel light-transmissive axes, wherein the horizontal axis represents the wavelength of the light ray and the vertical axis represents the transmission rate. It can be known from FIG. 3 that the upper limit of the transmission rate of the LCD panel is 0.35.

Figure 4A:
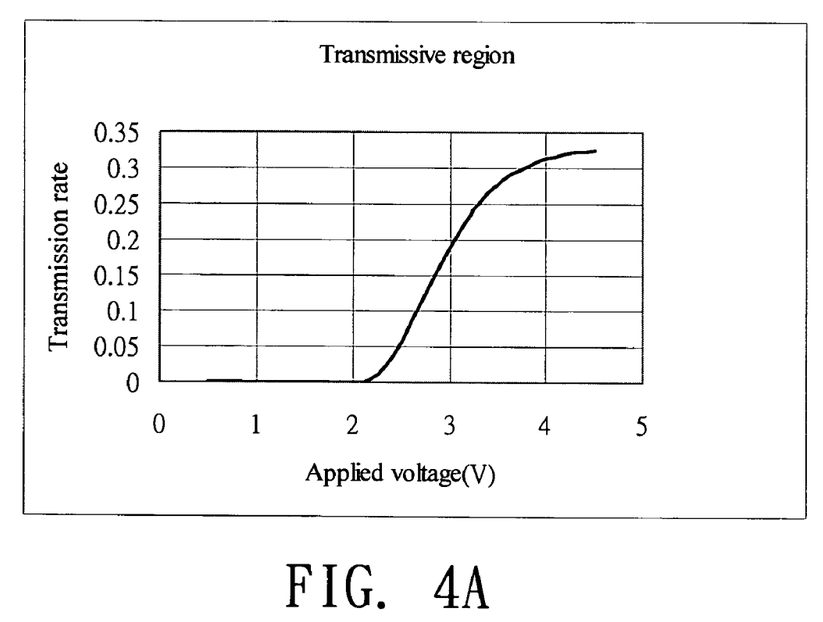
Figure 4B:
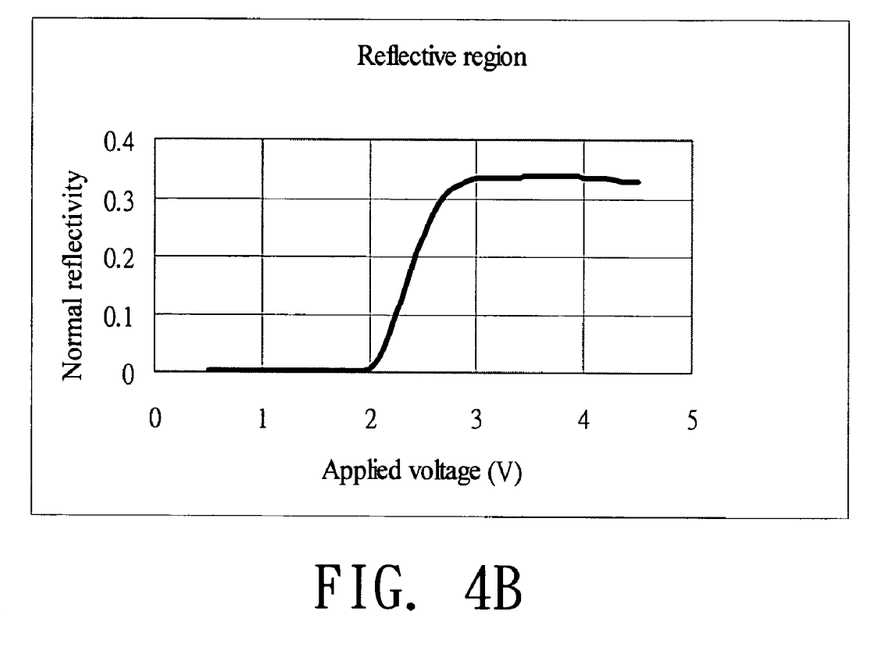

FIGS. 4A and 4B show relationships between the applied voltages (V) and the transmission rates of the LCD panel of FIGS. 2A and 2B, respectively, wherein FIG. 4A shows the transmission rate of the transmissive region and FIG. 4B shows the normal reflectivity of the reflective region. For example, the results of FIGS. 4A and 4B are obtained by simulation using a liquid crystal having a model number of MJ961213, wherein the gap G between the upper substrate 206 and the lower substrate 208 is 4.5 $\mu$m, the pitch of the second liquid crystal layer 212B of the reflective region 204 is 16 $\mu$m, and the tilt angle when no voltage is applied to the liquid crystal molecule is 89 degrees. When the maximum operation voltage is 4V, the transmission rate of the transmissive region is about 0.33 and the normal reflectivity of the reflective region is about 0.34, as shown in FIGS. 4A and 4B, respectively. Thus, under the condition that the transmissive region 202 and the reflective region 204 have the same gap G between the upper substrate 206 and the lower substrate 208 in the first embodiment of the invention, both the transmissive region 202 and the reflective region 204 may reach the high transmission rate and the high optical efficiency.

Figure 5:
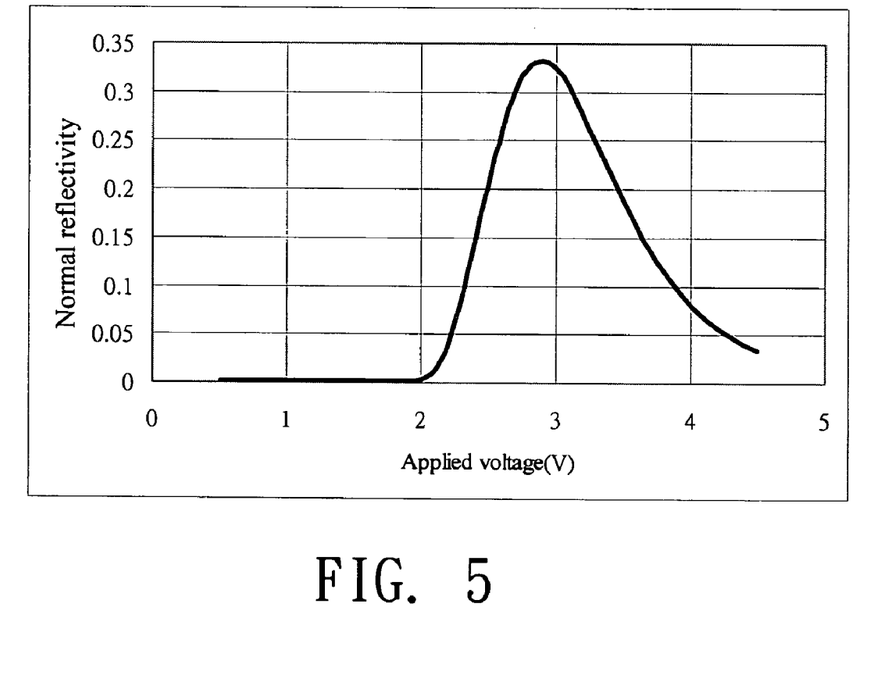
FIG. 5 shows the relationship between the applied voltage and the normal reflectivity in a transflective LCD panel with the vertical alignment mode and a single gap but without any chiral material doped.

On the contrary, if no chiral material is doped in the second liquid crystal layer 212B of the LCD panel of FIGS. 2A and 2B (i.e., the conventional single-gap VA transflective LCD panel), the normal reflectivity of the reflective region 204 will be seriously reduced. FIG. 5 shows the relationship between the applied voltage and the normal reflectivity in a transflective LCD panel with the vertical alignment mode and a single gap but without any chiral material doped. As shown in FIG. 5, after the voltage is greater than 2.9V, the normal reflectivity is reduced as the applied voltage is increased. Thus, this single-gap VA transflective LCD panel without any chiral material doped really cannot make both of the reflective region and the transmissive region reach good transmission rates. However, the invention really solves the problem of incapable of possessing good optical efficiency for the reflective mode and the transmissive mode in the conventional LCD panel.

Second Embodiment

In the first embodiment, two quarter-wavelength plates and two half-wavelength plates, which are equivalent to two broadband quarter-wavelength plates, are utilized. In the second embodiment, no half-wavelength plate is used but only two quarter-wavelength plates are utilized to achieve the object of the invention.

Figure 6A:
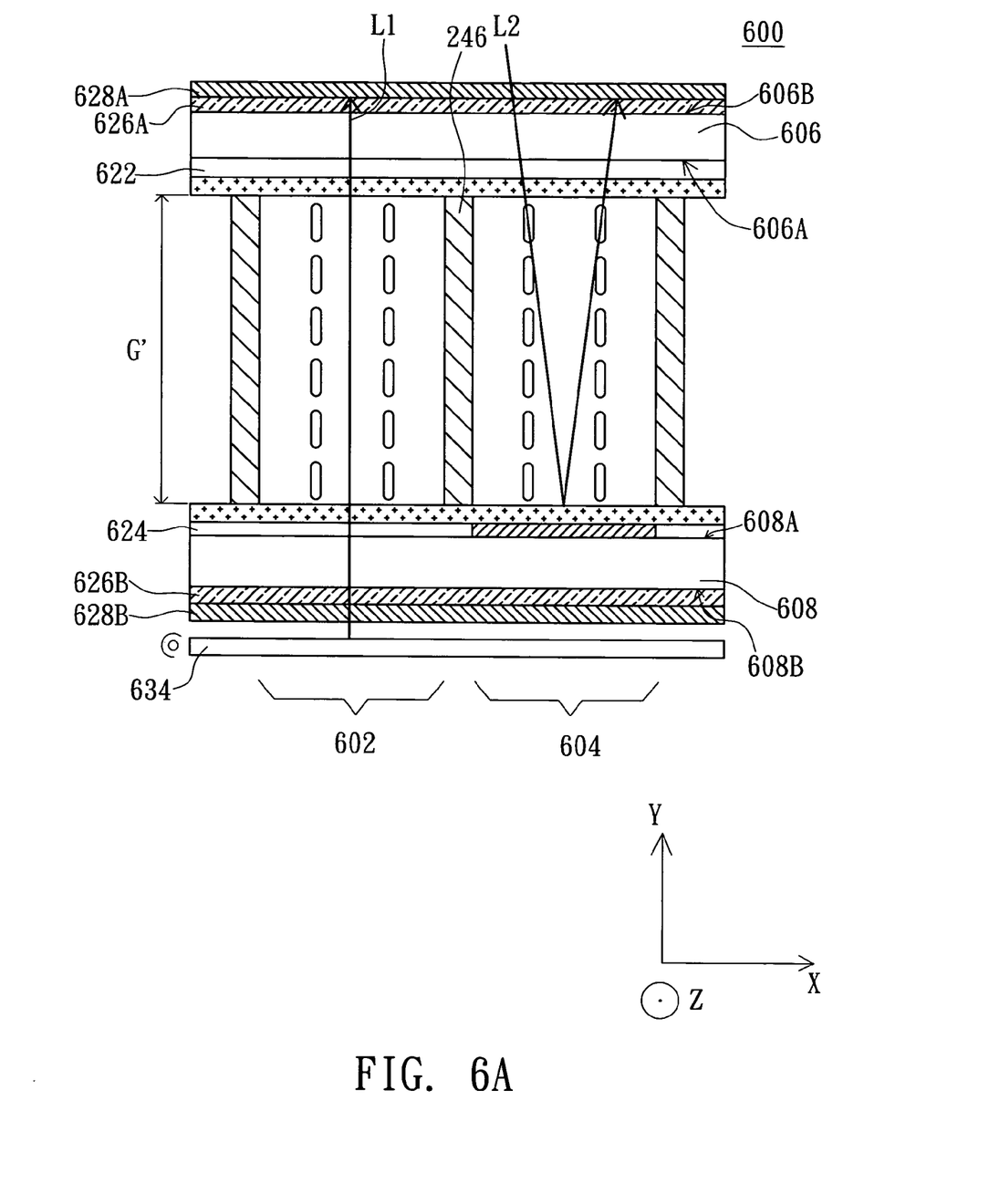
FIG. 6A is a schematic illustration showing a transflective LCD panel in a dark state according to a second embodiment of the invention.
Figure 6B:
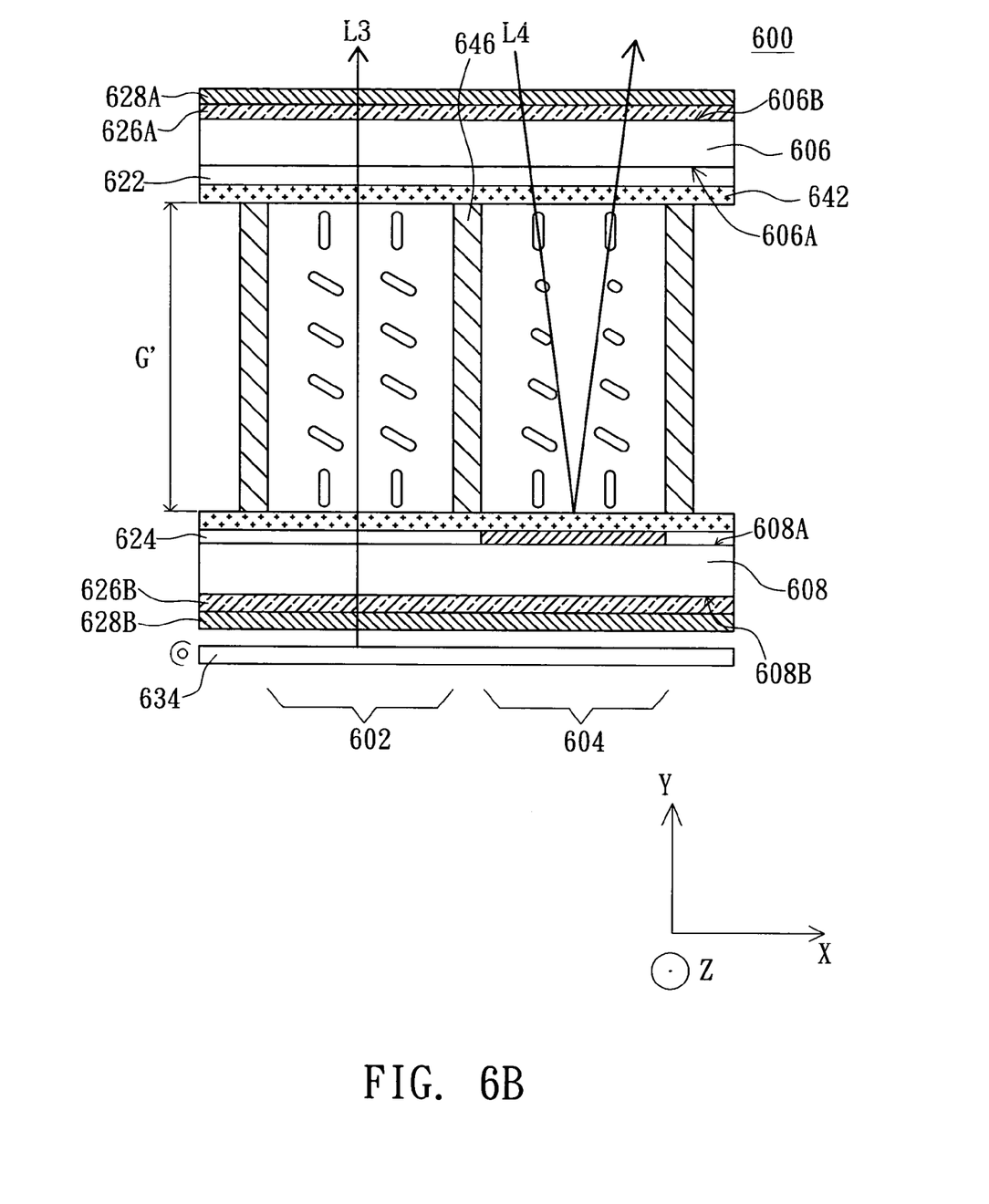
FIG. 6B is a schematic illustration showing the transflective LCD panel in a bright state according to the second embodiment of the invention.

FIG. 6A is a schematic illustration showing a transflective LCD panel in a dark state according to a second embodiment of the invention. FIG. 6B is a schematic illustration showing the transflective LCD panel in a bright state according to the second embodiment of the invention. In the transflective LCD panel 600 as shown in FIGS. 6A and 6B, a first quarter-wavelength plate 626A is disposed above a second surface 606B of an upper substrate 606. A first linear polarizer 628A is disposed above the first quarter-wavelength plate 626A. A second quarter-wavelength plate 626B is disposed below a second surface 608B of a lower substrate 608. A second linear polarizer 628B is disposed below the second quarter-wavelength plate 626B.

The light-transmissive axes (Trans-axes) of the first and second linear polarizers 628A and 628B are orthogonal, and the optical axes of the first and second quarter-wavelength plates 626A and 626B are also orthogonal. In this embodiment, it is assumed that the angle between the X-axis and the light-transmissive axis of the first linear polarizer 628A is 0 degrees, the axis between the X-axis and the light-transmissive axis of the second linear polarizer 628B is 90 degrees, the angle between the X-axis and the optical axis of the first quarter-wavelength plate 626A is 45 degrees, and the angle between the X-axis and the optical axis of the second quarter-wavelength plate 626B is (−45) degrees.

The simulation result for the second embodiment of the invention will be described in the following.

Figure 7A:
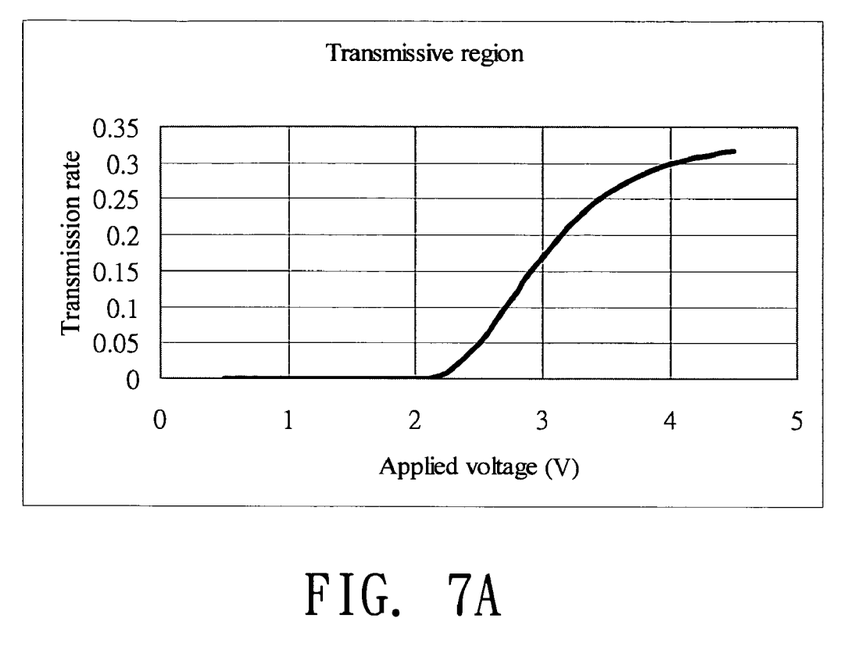
Figure 7B:
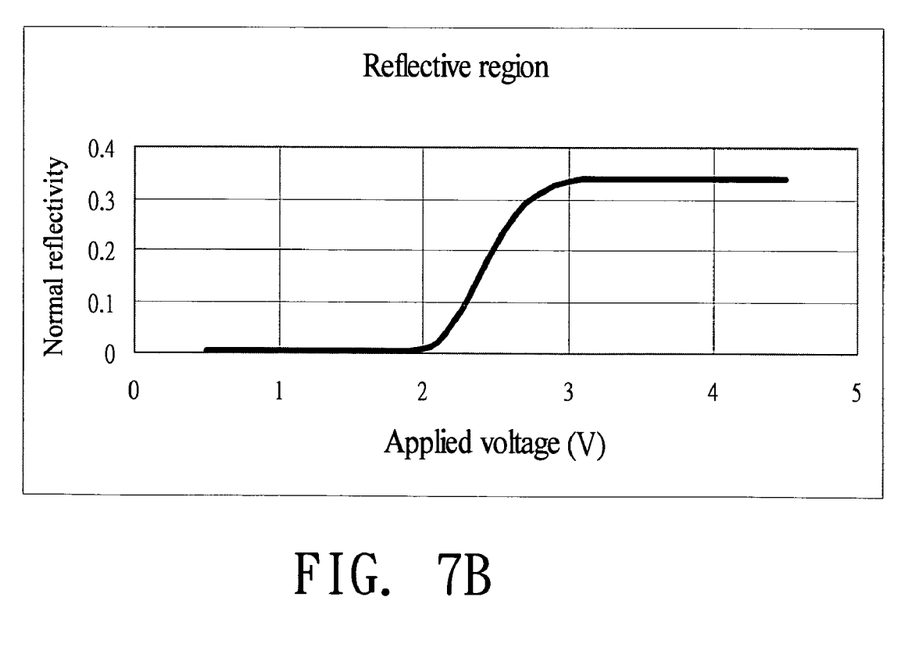

FIGS. 7A and 7B show relationships between the applied voltages (V) and the transmission rates of the LCD panel of FIGS. 6A and 6B, respectively, wherein FIG. 7A shows the transmission rate of the transmissive region and FIG. 7B shows the normal reflectivity of the reflective region. The results of FIGS. 7A and 7B are obtained by simulation using a liquid crystal having a model number of MJ961213, wherein the gap G' between the upper substrate 606 and the lower substrate 608 is 4.2 $\mu$m, the pitch of the second liquid crystal layer 612B of the reflective region 604 is 16 $\mu$m, and the tilt angle when no voltage is applied to the liquid crystal molecule is 89 degrees. When the maximum operation voltage is 4V, the transmission rate of the transmissive region 602 is about 0.3 and the normal reflectivity of the reflective region 604 is about 0.34, as shown in FIGS. 7A and 7B, respectively. Thus, under the condition that the transmissive region 602 and the reflective region 604 have the same gap G' between the upper substrate 606 and the lower substrate 608 in the second embodiment of the invention, both the transmissive region 602 and the reflective region 604 may reach the high transmission rate and the high optical efficiency.

In the preferred embodiments of the invention, although the angle between the rubbing directions in the rubbing process for the first and second vertical alignment films is 180 degrees, the invention is not limited thereto. Instead, the angle between the rubbing directions in the rubbing process for the first and second vertical alignment films may be an arbitrary angle other than 180 degrees, wherein different angles cause the liquid crystal molecules to produce different twist angles.

The advantage of this invention is that the design of the transflective LCD panel may be effectively simplified and make the transflective LCD panel to easily reach better optical efficiency in both the transmissive mode and the reflective mode.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transflective LCD panel having a transmissive region and a reflective region, the LCD panel comprising:
    a first substrate;
    a second substrate opposite to the first substrate;
    a common electrode formed on a first surface of the first substrate;
    a pixel electrode formed on a first surface of the second substrate, the pixel electrode being opposite to the common electrode;
    a reflective plate formed on the first surface of the second substrate and located within the reflective region;
    a first quarter-wavelength disposed above a second surface of the first substrate;
    a first linear polarizer disposed above the first quarter-wavelength plate;
    a second quarter-wavelength plate disposed below a second surface of the second substrate;
    a second linear polarizer disposed below the second quarter-wavelength plate;
    a first alignment film and a second alignment film, the first alignment film covering the common electrode and the second alignment film covering the pixel electrode and the reflective plate; and
    a first liquid crystal layer and a second liquid crystal layer filled between the first substrate and the second substrate, the first liquid crystal layer corresponding to the transmissive region, the second liquid crystal layer corresponding to the reflective region, and the second liquid crystal layer being doped with a chiral material;

wherein when a voltage is applied between the common electrode and the pixel electrode, liquid crystal molecules in a middle section of the first liquid crystal layer are substantially arranged in a tilt angle, and the liquid crystal molecules of the second liquid crystal layer are tilted by the tilt angle and further twisted.

2. The LCD panel according to claim 1, wherein the first liquid crystal layer and the second liquid crystal layer are spaced apart by a wall.

3. The LCD panel according to claim 1, wherein a gap is formed between the first substrate and the second substrate, and a pitch when the liquid crystal molecules of the second liquid crystal layer are twisted is greater than or equal to four times of the gap.

4. The LCD panel according to claim 3, wherein the pitch is substantially 20 to 40 microns ($\mu$m).

5. The LCD panel according to claim 1, wherein the chiral material is a tunable chiral material (TCM), which is also doped in the first liquid crystal layer, and by controlling different exposure amounts applied to the first and second liquid crystal layers, an effective concentration of the chiral material in the second liquid crystal layer is greater than that of the chiral material in the first liquid crystal layer.

6. The LCD panel according to claim 1, wherein the first and second alignment films are vertical alignment films, the liquid crystal molecules of the first and second liquid crystal layers are negative type liquid crystal molecules, and when no voltage is applied between the common electrode and the pixel electrode, the liquid crystal molecules of the first and second liquid crystal layers are perpendicular to the first vertical alignment film.

7. The LCD panel according to claim 1, further comprising a first half-wavelength plate and a second half-wavelength plate, the first half-wavelength plate being disposed between the first quarter-wavelength plate and the first linear polarizer, the second half-wavelength plate being disposed between the second quarter-wavelength plate and the second linear polarizer.

8. A transflective LCD panel having a transmissive region and a reflective region, the LCD panel comprising:

a first substrate;

a second substrate opposite to the first substrate, a gap being formed between the first substrate and the second substrate;

a common electrode formed on a first surface of the first substrate;

a pixel electrode formed on a first surface of the second substrate, the pixel electrode being opposite to the common electrode;

a reflective plate formed on the first surface of the second substrate and located within the reflective region;

a first quarter-wavelength plate disposed above a second surface of the first substrate;

a first linear polarizer disposed above the first quarter-wavelength plate;

a second quarter-wavelength plate disposed below a second surface of the second substrate;

a second linear polarizer disposed below the second quarter-wavelength plate;

a first vertical alignment film and a second vertical alignment film, the first vertical alignment film covering the common electrode and the second vertical alignment film covering the pixel electrode and the reflective plate; and a first liquid crystal layer and a second liquid crystal layer filled between the first substrate and the second substrate and spaced apart by a wall, the first liquid crystal layer corresponding to the transmissive region, the second liquid crystal layer corresponding to the reflective region, liquid crystal molecules of the first and second liquid crystal layers being negative liquid crystal molecules, and the second liquid crystal layer being doped with a chiral material;

wherein when a voltage is applied between the common electrode and the pixel electrode, the liquid crystal molecules in a middle section of the first liquid crystal layer are substantially arranged in a tilt angle, the liquid crystal molecules of the second liquid crystal layer are tilted by the tilt angle and further twisted, and a pitch when the liquid crystal molecules of the second liquid crystal layer are twisted is greater than or equal to four times of the gap.

9. The LCD panel according to claim 8, wherein the pitch is substantially 20 to 40 microns ($\mu$m).

10. The LCD panel according to claim 8, further comprising a first half-wavelength plate and a second half-wavelength plate, the first half-wavelength plate being disposed between the first quarter-wavelength plate and the first linear polarizer, the second half-wavelength plate being disposed between the second quarter-wavelength plate and the second linear polarizer.

11. A transflective LCD panel having a transmissive region and a reflective region, the LCD panel comprising:

a first substrate;

a second substrate opposite to the first substrate, a gap being formed between the first substrate and the second substrate;

a common electrode formed on a first surface of the first substrate;

a pixel electrode formed on a first surface of the second substrate, the pixel electrode being opposite to the common electrode;

a reflective plate formed on the first surface of the second substrate and located within the reflective region;

a first quarter-wavelength plate disposed above a second surface of the first substrate;

a first linear polarizer disposed above the first quarter-wavelength plate;

a second quarter-wavelength plate disposed below a second surface of the second substrate;

a second linear polarizer disposed below the second quarter-wavelength plate;

a first vertical alignment film and a second vertical alignment film, the first vertical alignment film covering the common electrode and the second vertical alignment film covering the pixel electrode and the reflective plate; and a first liquid crystal layer and a second liquid crystal layer filled between the first substrate and the second substrate and spaced apart by a wall, the first liquid crystal layer corresponding to the transmissive region, the second liquid crystal layer corresponding to the reflective region, liquid crystal molecules of the first and second liquid crystal layers being negative liquid crystal molecules, the first liquid crystal layer being doped with a chiral material having a first concentration, and the second liquid crystal layer being doped with the chiral material having a second concentration, wherein the second concentration is greater than the first concentration.

12. The LCD panel according to claim 11, wherein the chiral material is a tunable chiral material, and by controlling different exposure amounts applied to the first and second liquid crystal layers, the second concentration is greater than the first concentration.

13. The LCD panel according to claim 11, further comprising a first half-wavelength plate and a second half-wavelength plate, the first half-wavelength plate being disposed between the first quarter-wavelength plate and the first linear polarizer, the second half-wavelength plate being disposed between the second quarter-wavelength plate and the second linear polarizer.

* * * * *